US012631601B2

(12) United States Patent
Noda

(10) Patent No.: US 12,631,601 B2
(45) Date of Patent: May 19, 2026

(54) CHROMATOGRAPHY QUALITY CONTROL DEVICE AND CHROMATOGRAPHY QUALITY CONTROL METHOD

(71) Applicant: SHIMADZU CORPORATION, Kyoto (JP)

(72) Inventor: Akira Noda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 357 days.

(21) Appl. No.: 18/220,653

(22) Filed: Jul. 11, 2023

(65) Prior Publication Data

US 2024/0011950 A1     Jan. 11, 2024

(30) Foreign Application Priority Data

Jul. 11, 2022     (JP) ................................. 2022-111304

(51) Int. Cl.
*G01N 30/06*          (2006.01)
*G01N 30/04*          (2006.01)
*G01N 30/88*          (2006.01)

(52) U.S. Cl.
CPC ............. *G01N 30/06* (2013.01); *G01N 30/88* (2013.01); *G01N 2030/045* (2013.01); *G01N 2030/8886* (2013.01)

(58) Field of Classification Search
CPC .... G01N 30/06; G01N 30/88; G01N 30/8662; G01N 30/8658; G01N 2030/045; G01N 2030/8886; G01N 30/8624
See application file for complete search history.

(56) References Cited

U.S. PATENT DOCUMENTS

2016/0209380 A1     7/2016  Mishima et al.
2018/0087961 A1     3/2018  Noda

FOREIGN PATENT DOCUMENTS

CN      107076712 A      8/2017
JP      2017-032470 A    2/2017
JP      2018-054337 A    4/2018
WO      2015/029508 A1   3/2015

OTHER PUBLICATIONS

"Guidelines for Impurities in Drug Substances of New Active Ingredients", Dec. 16, 2022.
Felten et al., "Vibrational spectroscopic image analysis of biological material using multivariate curve resolution—alternating least squares", NPG, Nature Protocols, 2015, 10, pp. 217-240.

(Continued)

*Primary Examiner* — An H Do
(74) *Attorney, Agent, or Firm* — Muir Patent Law, PLLC

(57) ABSTRACT

A chromatography quality control device includes a measurement data acquirer that acquires measurement data obtained as a result of measurement in a chromatograph and stores the measurement data in a storage device, a chromatogram factorizer that retrieves the measurement data from the storage device, dimensionally compresses a chromatogram obtained from the measurement data by factorization and stores component data, the component data obtained by the factorization, in the storage device, and a component data outputter that retrieves the component data from the storage device and outputs the component data to a display device.

6 Claims, 9 Drawing Sheets

(56) References Cited

OTHER PUBLICATIONS

Masamitsu Okawara, "Standard Education Program Specific Technical Field—Chemical Field", Dec. 23, 2008.
Notice of Reasons for Refusal dated Feb. 3, 2026, in the counterpart Japanese patent application 2022-111304.
Office Action dated Dec. 19, 2025, in the counterpart Chinese patent application CN 202310803524.3.

F I G. 1
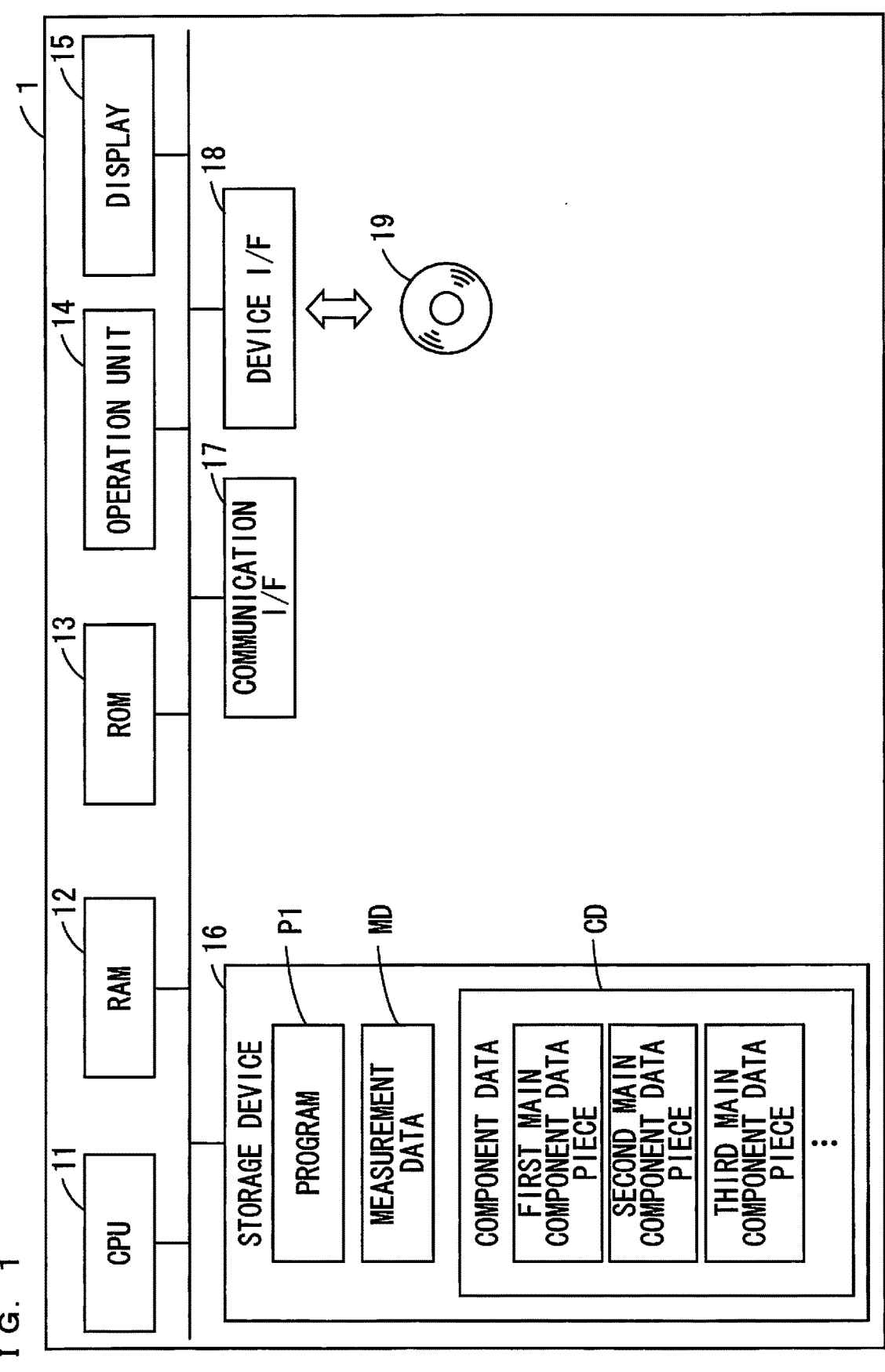

F I G. 2
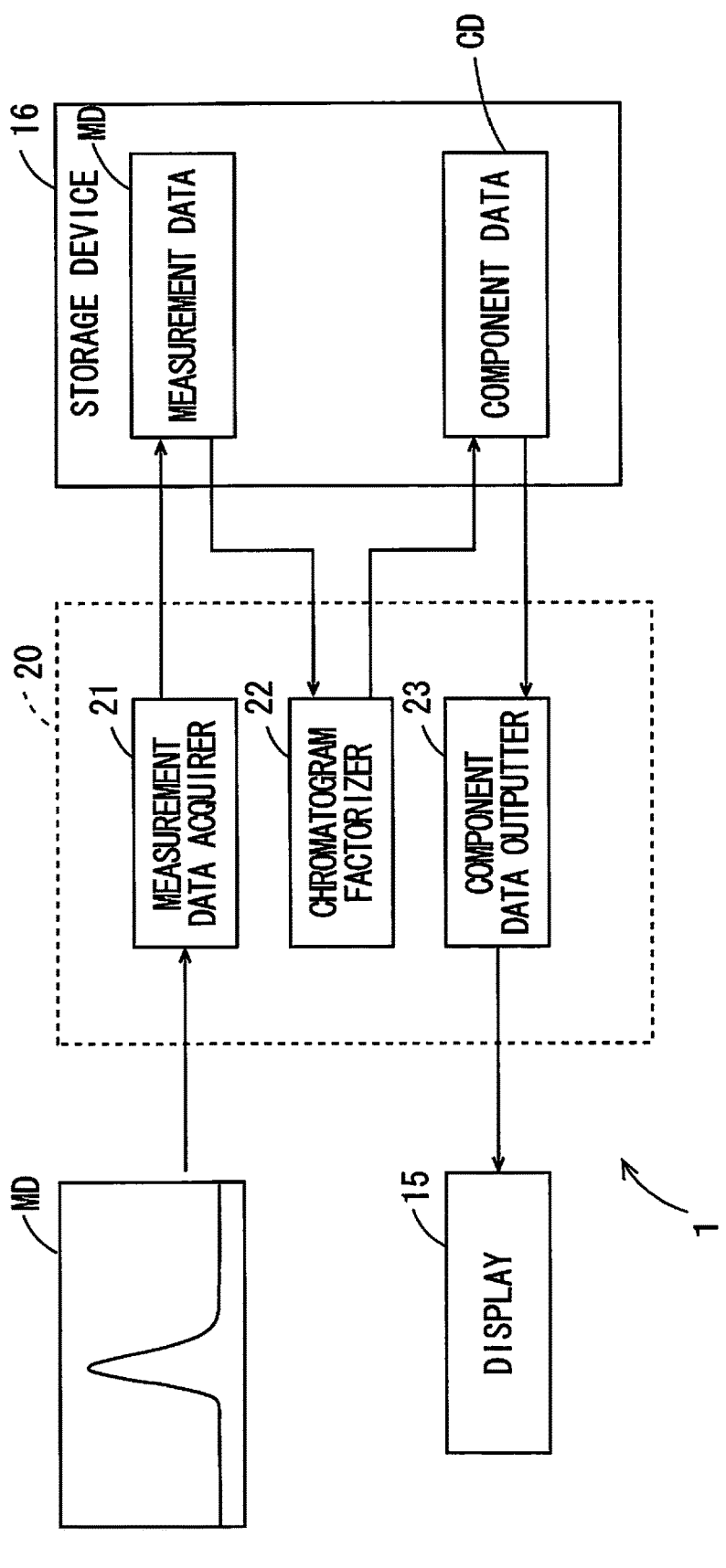

F I G.  3
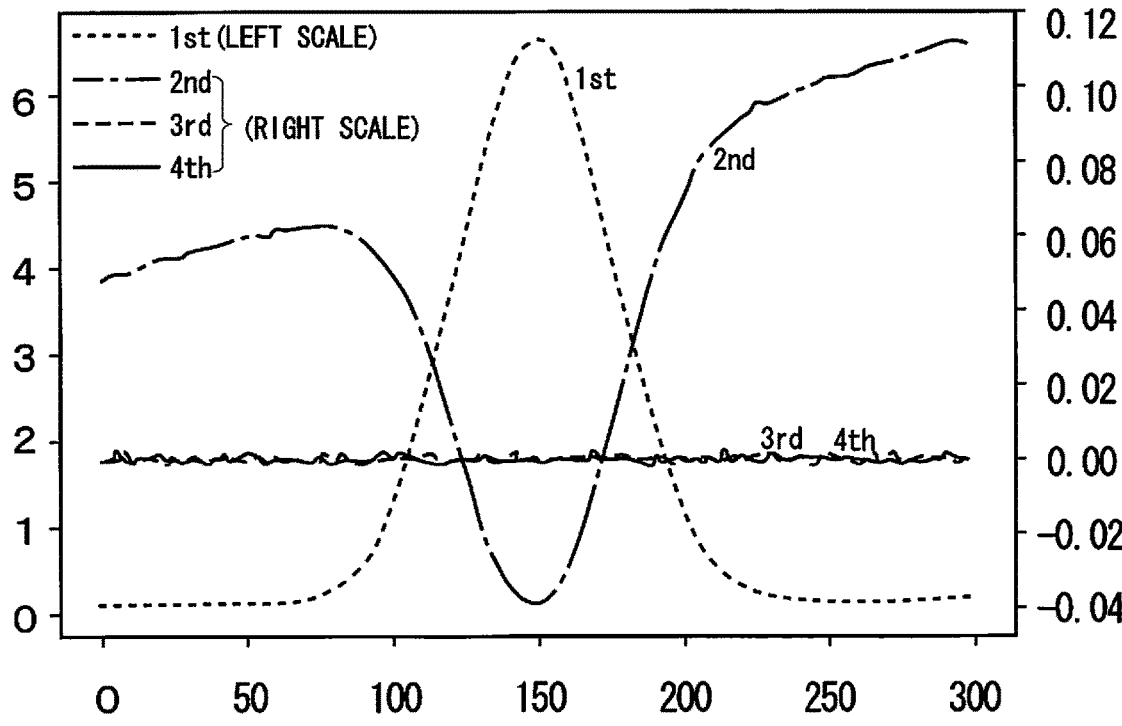

F I G. 4
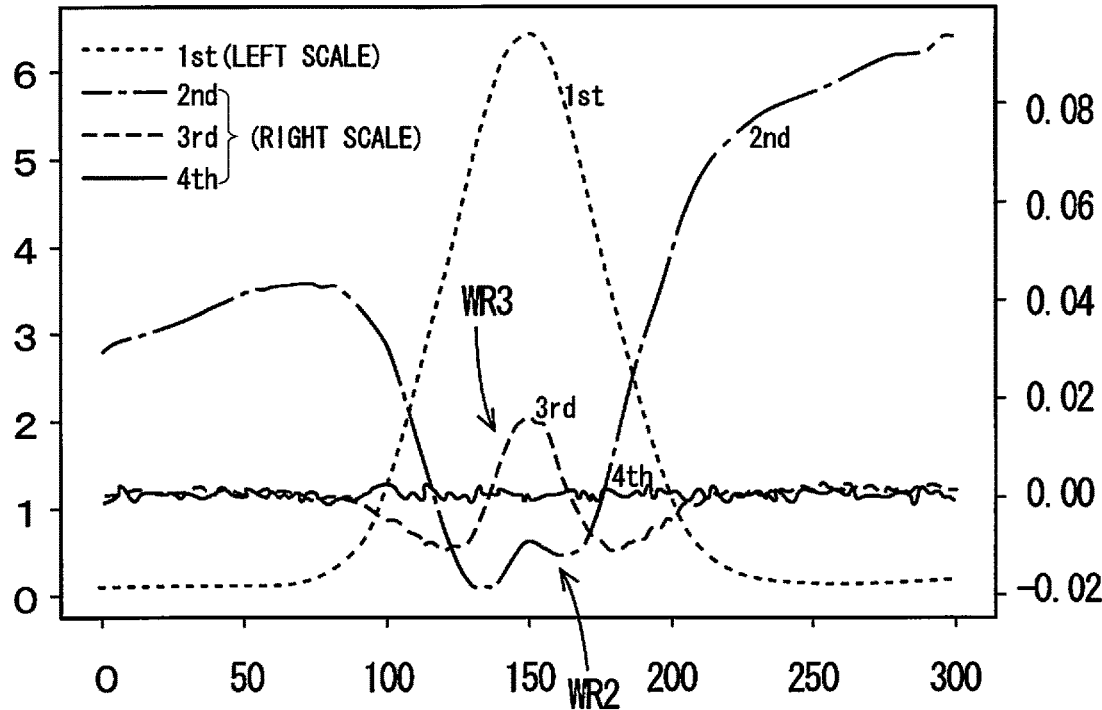

F I G.  5
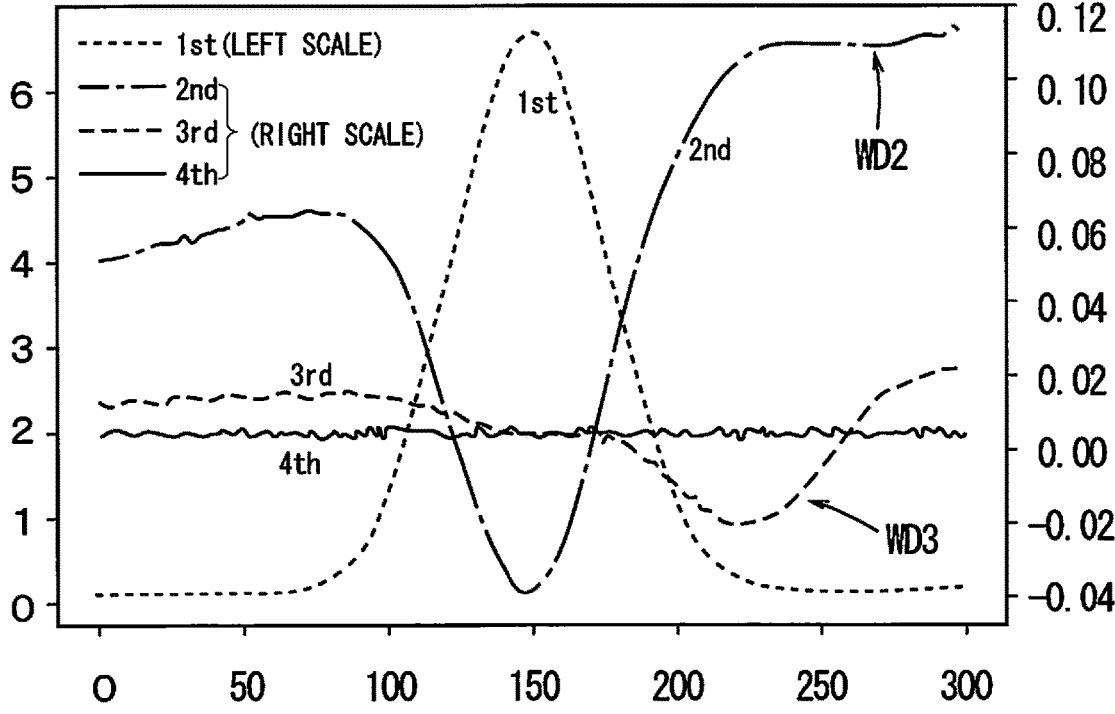

F I G.  6
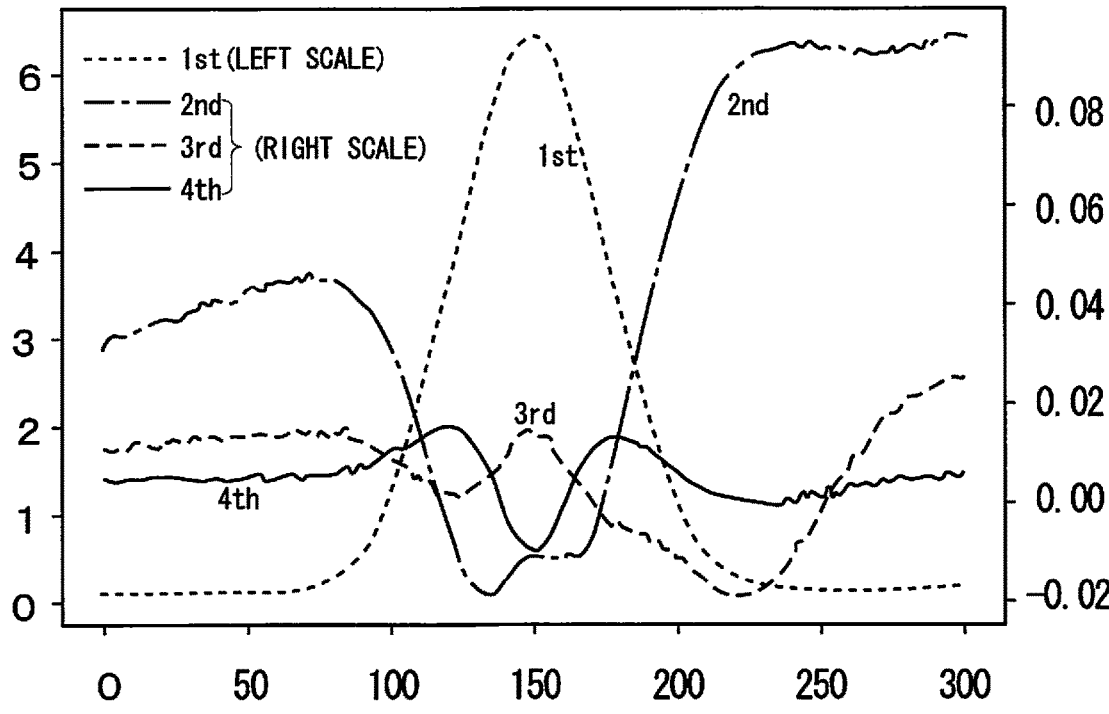

F I G. 7
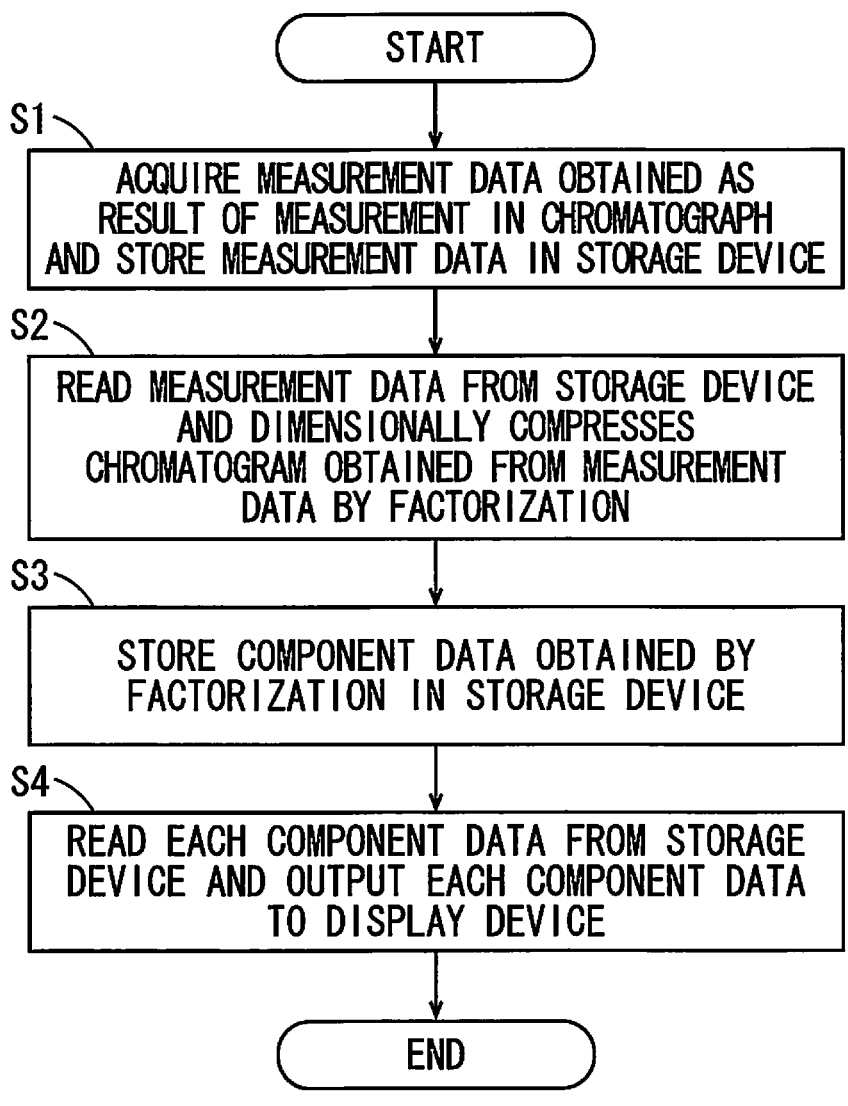

F I G.  8
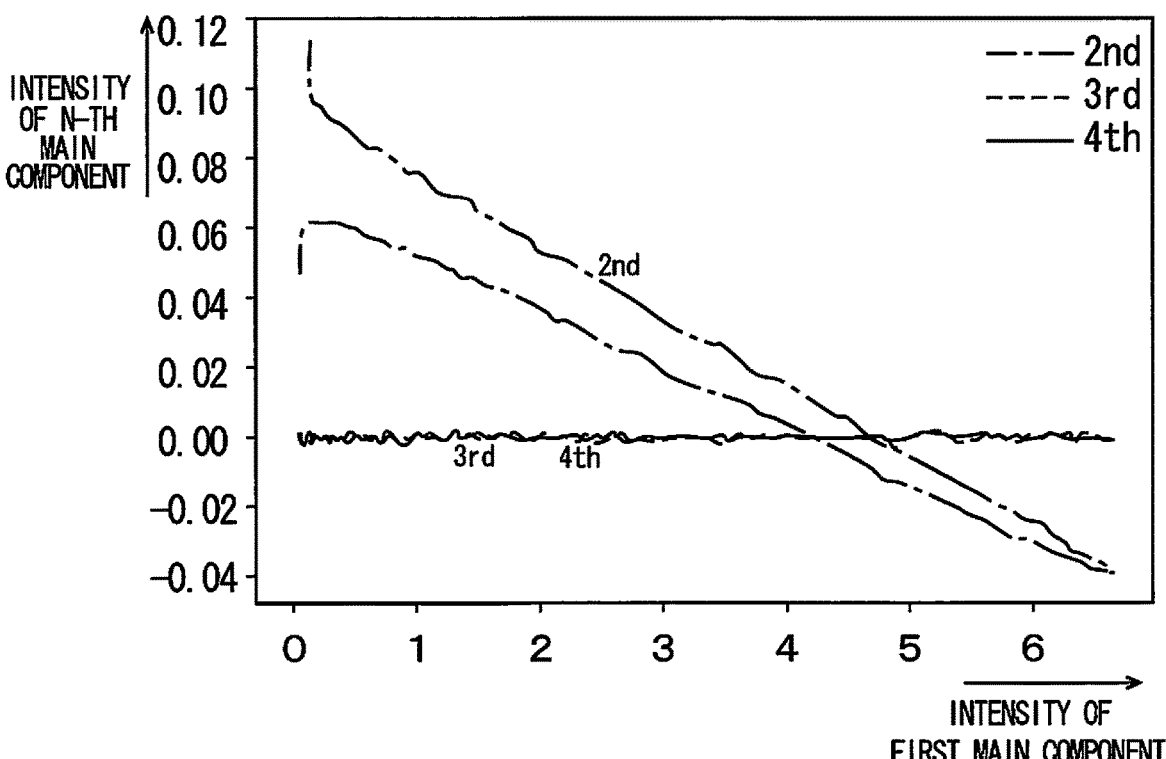

F I G.  9
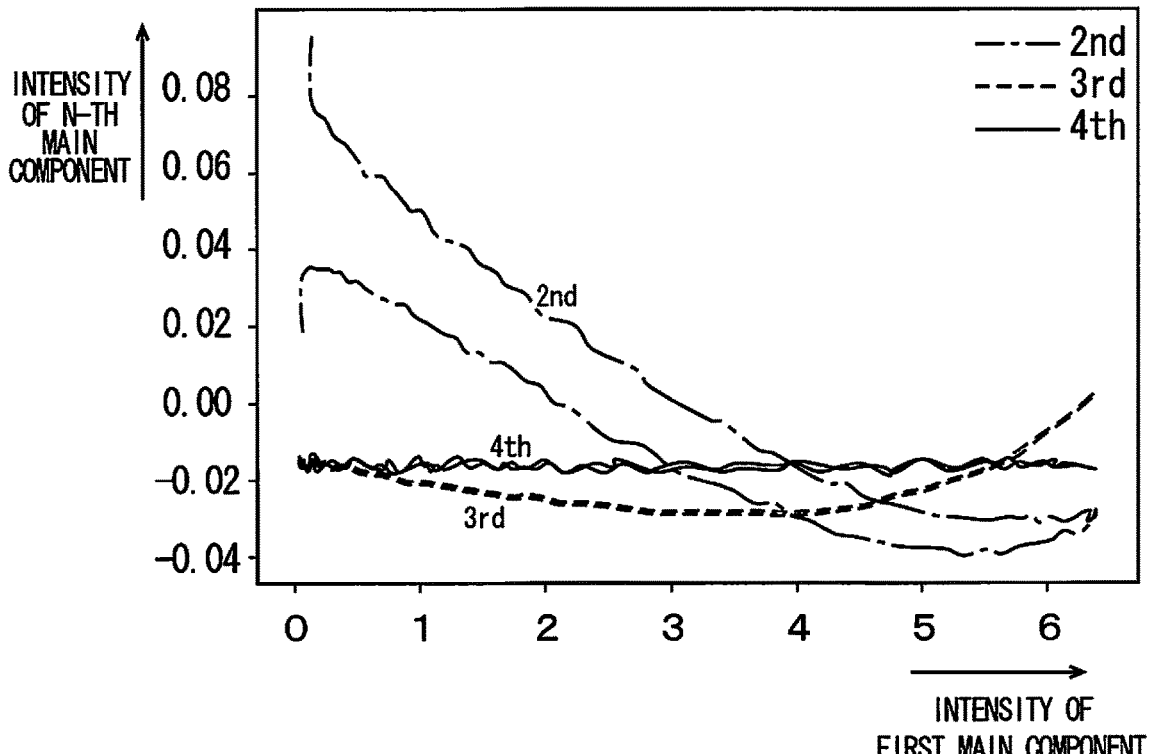

CHROMATOGRAPHY QUALITY CONTROL DEVICE AND CHROMATOGRAPHY QUALITY CONTROL METHOD

BACKGROUND

Technical Field

The present invention relates to a device and a method for controlling the quality of chromatography.

Description of Related Art

Linearity is used as a quality indicator of chromatography. Linearity represents the ability of chromatography which causes a measurement value to have a linear relationship with the concentration of an analysis subject. Linearity is used as one indicator for analysis validation in Standard Education Program "Specific Technical Field—Chemical Field" written by Masamitsu Okawara on Dec. 23, 2008, <https://www.jsa.or.jp/datas/media/10000/md_2507.pdf>. WO 2015/029508 A1 discloses a method of evaluating linearity by using a calibration curve.

Further, an analysis process such as peak separation and impurity detection is performed on measurement data obtained by a chromatograph. WO 2015/029508 A1 discloses a method of confirming purity in chromatography having sufficient linearity. That is, it is confirmed that there is no impurity, with utilization of the fact that the spectra of chromatograms derived from the same substance have similar shapes even in a case in which the intensities are different.

SUMMARY

In normal analysis validation, as long as a value of peak area does not vary greatly, some degradation of linearity does not cause a major problem. However, it is necessary to detect impurities in regard to the order of 0.05% in a case in which whether analogous impurities are included is determined in confirmation of purity of a middle-molecular drug or the like. Further, since an analogous compound generally has a high degree of similarity to the main component in both of its optical and mass spectra, it is necessary to capture an extremely small spectral variation. It is difficult to obtain the linearity corresponding to such an extremely small spectral variation from a calibration curve in view of sample preparation.

Further, a standard sample such as caffeine is generally used for confirmation of linearity. However, in a detector that detects light dispersed by a spectrometer, linearity may degrade due to light (stray light) incident on the detector from a position out of a normal path. In this manner, since some linearity degradation also has wavelength dependency, it is necessary to confirm linearity by using actual measurement data instead of a standard sample.

An object of the present invention is to evaluate highly accurate linearity in chromatography.

A chromatography quality control device according to one aspect of the present invention includes a measurement data acquirer that acquires measurement data obtained as a result of measurement in a chromatograph and stores the measurement data in a storage device, a chromatogram factorizer that retrieves the measurement data from the storage device, dimensionally compresses a chromatogram obtained from the measurement data by factorization and stores component data, the component data obtained by the factorization, in the storage device, and a component data outputter that retrieves the component data from the storage device and outputs the component data to a display device.

A chromatography quality control method according to another aspect of the present invention include acquiring measurement data obtained as a result of measurement in a chromatograph and storing the measurement data in a storage device, retrieving the measurement data from the storage device, dimensionally compressing a chromatogram obtained from the measurement data by factorization and storing component data, the component data obtained by the factorization, in the storage device, and retrieving the component data from the storage device and outputting the component data to a display device.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 1 is a diagram showing the configuration of a chromatography quality control device according to the present embodiment;

FIG. 2 is a block diagram showing the functions of the chromatography quality control device according to the present embodiment;

FIG. 3 is a diagram showing the component data obtained by factorization of measurement data;

FIG. 4 is a diagram showing the component data obtained by factorization of measurement data in a case in which linearity degradation is present;

FIG. 5 is a diagram showing the component data obtained by factorization of measurement data including impurities;

FIG. 6 is a diagram showing the component data obtained by factorization of measurement data including impurities in a case in which linearity degradation is present;

FIG. 7 is a flowchart showing a chromatography quality control method according to an embodiment;

FIG. 8 is a diagram showing the component data obtained by factorization of measurement data in a different manner; and FIG. 9 is a diagram showing the component data obtained by factorization of measurement data in a different manner in a case in which linearity degradation is present.

DETAILED DESCRIPTION

A chromatography quality control device and a chromatography quality control method according to embodiments of the present invention will now be described with reference to the attached drawings.

(1) Configuration of Chromatography Quality Control Device

FIG. 1 is a diagram showing the configuration of the chromatography quality control device 1 according to an embodiment. The chromatography quality control device 1 of the present embodiment acquires measurement data MD of a sample obtained in a chromatograph such as a liquid chromatograph or a gas chromatograph. The chromatography quality control device 1 confirms the quality of chromatography by analyzing the measurement data MD.

The chromatography quality control device 1 of the present embodiment is constituted by a personal computer, for example. As shown in FIG. 1, the chromatography quality control device 1 includes a CPU (Central Processing Unit) 11, a RAM (Random Access Memory) 12, a ROM (Read Only Memory) 13, an operation unit 14, a display 15, a storage device 16, a communication interface (I/F) 17 and a device interface (I/F) 18.

The CPU 11 controls the chromatography quality control device 1 as a whole. The RAM 12 is used as a work area for execution of a program by the CPU 11. Various data, a program and the like are stored in the ROM 13. The operation unit 14 receives an input operation performed by a user. The operation unit 14 includes a keyboard, a mouse, etc. The display 15 displays information for confirming the quality of chromatography. The storage device 16 is a storage medium such as a hard disc. A program P1, the measurement data MD and component data CD are stored in the storage device 16. The program P1 executes a process of acquiring a chromatogram, a process of dimensionally compressing a chromatogram by factorization to acquire the component data CD, a process of displaying the component data CD on the display 15, etc. The communication interface 17 is an interface that communicates with another computer through wireless or wired communication. The device interface 18 is an interface that accesses a storage medium 19 such as a CD, a DVD or a semiconductor memory.

(2) Functional Configuration of Chromatography Quality Control Device

FIG. 2 is a block diagram showing the functional configuration of the chromatography quality control device 1. In FIG. 2, a controller 20 is a function that is implemented by execution of the program P1 by the CPU 11 while the CPU 11 uses the RAM 12 as a work area. The controller 20 includes a measurement data acquirer 21, a chromatogram factorizer 22 and a component data outputter 23. That is, the measurement data acquirer 21, the chromatogram factorizer 22 and the component data outputter 23 are functions implemented by execution of the program P1. In other words, each of the functions 21 to 23 is the functions included in the CPU 11.

The measurement data acquirer 21 acquires the measurement data MD obtained as a result of measurement in the chromatograph. The measurement data acquirer 21 receives the measurement data MD from another computer, an analysis device or the like via the communication interface 17, for example. Alternatively, the measurement data acquirer 21 receives the measurement data MD stored in the storage medium 19 via the device interface 18. The measurement data acquirer 21 stores the acquired measurement data MD in the storage device 16.

The chromatogram factorizer 22 retrieves the measurement data MD from the storage device 16, dimensionally compresses a chromatogram obtained from the measurement data MD by factorization, and stores the component data CD obtained by factorization in the storage device 16.

The component data outputter 23 retrieves the component data CD from the storage device 16 and outputs the component data CD to the display 15. The component data outputter 23 displays the component data CD in such a manner that the quality of chromatography can be confirmed. The display 15 is an example of a display device in the present invention.

The program P1 is stored in the storage device 16, by way of example. In another embodiment, the program P1 may be provided in the form of being stored in the storage medium 19. The CPU 11 may access the storage medium 19 via the device interface 18 and may store the program P1 stored in the storage medium 19 in the storage device 16 or the ROM 13. Alternatively, the CPU 11 may access the storage medium 19 through the device interface 18 and may execute the program P1 stored in the storage medium 19. Alternatively, the CPU 11 may download the program P1 from a server on a network through the communication interface 17 and store the downloaded program P1 in the storage device 16 or the ROM 13.

(3) Measurement Data

In the present embodiment, the measurement data MD acquired by the measurement data acquirer 21 is multidimensional data acquired by a multidimensional detector included in the chromatograph. Here, the measurement data MD is three-dimensional data having a retention-time direction, a spectral direction (frequency direction) and an intensity as elements, by way of example. In this case, the measurement data MD is represented as matrix data having the row corresponding to the retention-time direction, the column corresponding the spectral direction and the intensity as an element. For example, the measurement data MD is the data acquired in a liquid chromatograph including a PDA detector (photodiode array detector).

The chromatogram factorizer 22 factorizes the measurement data MD acquired by the measurement data acquirer 21 to dimensionally compress the measurement data MD. Here, the measurement data MD having the retention-time direction, the spectral direction and the intensity as elements is dimensionally compressed in the spectral direction, by way of example. Data of each dimension compressed in the spectral direction is referred to as component data CD. As shown in FIG. 1, the component data CD includes data of a plurality of dimensions such as a first main component data piece, a second main component data piece, a third main component data piece and so on. In the present embodiment, the chromatogram factorizer 22 performs dimensional compression by factorization utilizing Singular Value Decomposition (SVD). A method other than SVD dimensional compression may be used for factorization. For example, NMF (Nonnegative Matrix Factorization), ICA (Independent Component Analysis) or the like can be used for factorization.

FIG. 3 is a diagram showing the measurement data MD compressed by the SVD dimensional compression. That is, FIG. 3 is a diagram showing the component data CD obtained by factorization of the measurement data MD. In FIG. 3, the abscissa indicates a retention time, and the ordinate indicates an intensity. FIG. 3 is a diagram showing the first to fourth main component data pieces out of the component data CD. Since there are two spectral components, which are a baseline and a peak signal, significant signals appear in the first main component data piece and the second main component data piece, and only noise is included in the third main component data piece and the fourth main component data piece. In FIG. 3, reference is made to the left scale for the first main component data piece, and reference is made to the right scale for the second to fourth main component data pieces. Thus, the first main component data pieces is displayed in a scale different from a scale in which the second to fourth main component data pieces are displayed.

FIG. 4 is a diagram showing the component data CD obtained by factorization of the measurement data MD in a case in which linearity degradation is present. In a case in which linearity degradation is derived from stray light or an electric circuit, the degree of linearity degradation generally changes in correlation with the intensity of a chromatogram. The chromatogram waveform of the main component appears strongly for the first main component data piece, and linearity degradation corresponding to the intensity of the chromatogram waveform appears for the second main component data piece and subsequent data pieces (the n-th main component data piece).

Because SVD is used for factorization in the present embodiment, linearity degradation appears as a W-shaped distorted waveform WR2 for the second main component piece as shown in FIG. 4. Similarly, linearity degradation appears as a W-shaped distorted waveform WR3 for the third main component data piece. That is, in a case in which a peak shape included in a chromatogram is bilaterally symmetric (symmetric before and after a certain point in time), the distortion of a waveform derived from linearity degradation also appears to be bilaterally symmetric (symmetric before and after a certain point in time) for the n-th main component data piece.

FIG. 5 is a diagram showing the component data CD obtained by factorization of the measurement data MD including impurities in a case in which linearity degradation is not present. In FIG. 5, because linearity degradation is not present, a distorted waveform derived from linearity degradation does not appear for the second main component data piece or the third main component data piece. Although SVD is used for factorization in this example, a W-shaped distorted waveform as shown in FIG. 4 does not appear.

In contrast, in FIG. 5, a distorted waveform WD2 derived from impurities appears for the second main component data piece. Similarly, a distorted waveform WD3 derived from impurities appears for the third main component data piece. The distorted waveforms WD2 and WD3 are distortions derived from impurity peaks and are not derived from linearity degradation. Thus, the distorted waveforms WD2 and WD3 do not have the symmetry found in the distorted waveforms WR2 and WR3 shown in FIG. 4.

FIG. 6 is a diagram showing the component data CD obtained by factorization of the measurement data MD including impurities in a case in which linearity degradation is present. In a case in which both of linearity degradation and an impurity peak are present, distorted waveforms respectively caused by the linearity degradation and the impurity peak are added. That is, a waveform obtained when the symmetrical distorted waveform shown in FIG. 4 and the non-symmetrical distorted waveform shown in FIG. 5 are added appears in FIG. 6. Therefore, as shown in FIG. 6, a W-shaped distorted waveform that is partially not symmetrical appears for the n-th main component data piece.

(4) Chromatography Quality Control Method

Next, the chromatography quality control method of the present embodiment will be described with reference to the flowchart of FIG. 7. The flowchart of FIG. 7 is a process realized by execution of the program P1 by the CPU 11.

In the step S1, the measurement data acquirer 21 acquires the measurement data MD obtained as a result of measurement in the chromatograph. The measurement data acquirer 21 stores the measurement data MD in the storage device 16.

In the step S2, the chromatogram factorizer 22 retrieves the measurement data MD from the storage device 16, and dimensionally compresses a chromatogram obtained from the measurement data MD by factorization.

In the step S3, the chromatogram factorizer 22 stores the component data CD obtained by factorization in the storage device 16. As shown in FIG. 1, the component data CD stored in the storage device 16 includes data of a plurality of dimensions. The chromatogram factorizer 22 stores the component data CD of a set number of dimensions such as the first to fourth main component data pieces in the storage device 16, for example. The number of dimensions stored as the component data CD may be settable by the user.

In the step S4, the component data outputter 23 retrieves each component data CD from the storage device 16 and outputs the component data CD to the display 15. Thus, the graphs of the component data CD as shown in FIGS. 3 to 6 are displayed on the display 15. Specifically, the first to n-th main component data pieces included in the component data CD are displayed in a superimposed manner to be aligned with the time axis. At this time, as shown in FIGS. 3 to 6, the intensity may be displayed in different scales. For example, the graph as shown in FIG. 3 is displayed on the display 15, so that the user can confirm that linearity of chromatography that has generated the measurement data MD is not degraded. For example, the graph as shown in FIG. 4 is displayed on the display 15, so that the user can confirm that linearity of chromatography that has generated the measurement data MD is degraded. For example, the graph as shown in FIG. 5 is displayed on the display 15, so that the user can confirm that linearity of chromatography that has generated the measurement data MD is not degraded and impurities are included in the measurement data MD. For example, the graph as shown in FIG. 6 is displayed on the display 15, so that the user can confirm that linearity of chromatography that has generated the measurement data MD is degraded and impurities are included in the measurement data MD.

As shown in FIGS. 3 to 6, in this example, the component data outputter 23 causes the display 15 to display the first to fourth main component data pieces of the component data CD. However, the number of dimensions to be displayed may be settable by the user. Since the measurement data MD includes two signals which are a main component and a baseline, it is preferable to display at least the first and second main component data pieces. Further, as shown in FIG. 4, because confirmation can be easily made in regard to linearity degradation for the third main component data piece, it is effective to display the third main component data piece in addition to the first and second main component data pieces. Further, as shown in FIG. 5, because presence or absence of impurities can be easily confirmed for the third main component data piece, it is preferable to display the third main component data piece in addition to the first and second main component data pieces.

In this manner, the user can confirm whether linearity degradation is present in chromatography or whether impurities are included in the measurement data MD by referring to the component data CD obtained by factorization of the measurement data MD. It is possible to confirm linearity degradation at such a low level that no problem is caused in analysis validation, by using the chromatography quality control device 1 of the present embodiment. For example, it is possible to confirm subtle linearity degradation which cannot be determined with a calibration curve.

Unlike a method of confirming linearity by creating a calibration curve using a standard sample as in conventional analysis validation, the chromatography quality control device 1 of the present embodiment can confirm linearity of chromatography by using the actual measurement data MD. Therefore, it is possible to confirm linearity degradation having wavelength dependency.

(5) Modified Examples

FIGS. 8 and 9 are diagrams showing modified examples of the component data CD displayed on the display 15 by the component data outputter 23. FIGS. 8 and 9 show the graphs that are created with the abscissa representing the intensity of the first main component data piece and the ordinate representing the intensity of the n-th main component data piece. FIG. 8 is a diagram obtained when the same data as the first to fourth main component data pieces shown in FIG. 3 is rewritten. That is, FIG. 8 is a diagram showing the component data CD obtained by factorization of measurement data MD in a case in which linearity degradation is not present. FIG. 9 is a diagram obtained when the same data as the first to fourth main component data pieces shown in FIG. 4 is rewritten. That is, FIG. 9 is a diagram showing the component data CD obtained by factorization of the measurement data MD in a case in which linearity degradation is present. In this manner, in a case in which linearity degradation is not present, the graph shows a linear shape. On the other hand, in a case in which linearity degradation is present, the graph shows a curved shape (arcuate shape). When the graphs are displayed in such manners, linearity degradation can be visually represented to the user. In another example, the component data outputter 23 may output a graph that is created with the ordinate representing the intensity of the first main component data piece and the abscissa representing the intensity of the n-th main component data piece.

Further, in another modified example, the component data outputter 23 may extract a component intensity derived from linearity degradation or a component intensity derived from impurities, and display the component intensities on the display 15. For example, an even function component and an odd function component around the peaktop of a chromatogram may be extracted, and the representative values of the extracted signal intensities may be displayed on the display 15. As described above, in the component data CD, linearity degradation has a symmetric shape, and impurities have a non-symmetrical shape. For example, with the peak center of a chromatogram set to a time t=0, an appropriate peak width W correlating with the peak width of the chromatogram is set. Then, with respect to an input signal i(t), $\Sigma i(t)*\cos(t/w)(-\pi < t/w < \pi)$ may be displayed on the display 15 as the index of the even function strength, and $\Sigma i(t)*\sin(t/w)(-\pi < t/w < \pi)$ may be displayed as the index of the odd function strength. The user can confirm the presence or absence of linearity degradation based on the magnitude of the index of the even function strength. Further, the user can confirm the presence or absence of impurities based on the magnitude of the index of the odd function strength. Alternatively, the component data outputter 23 may cause the display 15 to display the ratio or difference between the index of the even function strength and the index of the odd function strength. This also allows the user to identify the presence or absence of linearity degradation and the presence or absence of impurities.

In the above-mentioned embodiment, the measurement data MD is three-dimensional data acquired from a liquid chromatograph including a PDA detector, by way of example. In another example, the measurement data MD may be three-dimensional data acquired in a scan mode of a liquid chromatography-mass spectrometer. In this case, the measurement data MD is data of three dimensions, which are a retention time, a mass spectrum and an intensity.

(6) Aspects

It will be appreciated by those skilled in the art that the exemplary embodiments described above are illustrative of the following aspects.

(Item 1)

A chromatography quality control device according to one aspect includes a measurement data acquirer that acquires measurement data obtained as a result of measurement in a chromatograph and stores the measurement data in a storage device, a chromatogram factorizer that retrieves the measurement data from the storage device, dimensionally compresses a chromatogram obtained from the measurement data by factorization and stores component data, the component data obtained by the factorization, in the storage device, and a component data outputter that retrieves the component data from the storage device and outputs the component data to a display device.

Highly accurate linearity in chromatography can be evaluated.

(Item 2)

The chromatography quality control device according to item 1, wherein SVD, NMF or ICA may be used for factorization.

A factorization method can be selected according to the purpose.

(Item 3)

The chromatography quality control device according to item 1 or 2, wherein the component data outputter may output a first main component data piece and a second main component data piece of the component data to the display device.

The user can confirm the presence or absence of linearity and the presence or absence of impurities by confirming the states of signals of a main component and a baseline.

(Item 4)

The chromatography quality control device according to item 3, wherein the component data outputter may further output a third main component data piece to the display device.

The user can confirm the presence or absence of linearity and the presence or absence of impurities.

(Item 5)

The chromatography quality control device according to item 1 or 2, wherein the component data outputter may output the component data to the display device with one axis used for a first main component data piece and another axis used for a second main component data piece and data pieces of subsequent main components.

The user can confirm the presence or absence of linearity and the presence or absence of impurities in different manners.

(Item 6)

The chromatography quality control device according to item 1 or 2, wherein the component data outputter may output even function strength or odd function strength of the component data to the display device.

The user can confirm the presence or absence of linearity and the presence or absence of impurities.

(Item 7)

The chromatography quality control device according to item 1 or 2, wherein the component data outputter may output a ratio or difference between even function strength and odd function strength of the component data to the display device.

The user can confirm the presence or absence of linearity and the presence or absence of impurities.

(Item 8)

A chromatography quality control method according to another aspect includes acquiring measurement data obtained as a result of measurement in a chromatograph and storing the measurement data in a storage device, retrieving the measurement data from the storage device, dimensionally compressing a chromatogram obtained from the measurement data by factorization and storing component data, the component data obtained by the factorization, in the storage device, and retrieving the component data from the storage device and outputting the component data to a display device.

Highly accurate linearity in chromatography can be evaluated.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A chromatography quality control device comprising: a storage device, a processor and a display, wherein:

the storage device is configured to store measurement data obtained as a result of a chromatographic measurement, the measurement data being three-dimensional data having a retention-time direction, a spectral direction, and an intensity as elements, and the processor is configured to:

retrieve the measurement data from the storage device, dimensionally compress the measurement data in a spectral direction by factorization to generate component data including a first main component data piece and an n-th main component data piece, and output a graph to the display, the graph having a first axis representing an intensity of the first main component data piece and a second axis representing an intensity of the n-th main component data piece.

2. The chromatography quality control device according to claim 1, wherein SVD, NMF or ICA is used for factorization.

3. The chromatography quality control device according to claim 1, wherein the processor is configured to output the second axis representing an intensity of a second main component data piece.

4. The chromatography quality control device according to claim 1, wherein the processor is configured to output even function strength or odd function strength of the component data to the display.

5. The chromatography quality control device according to claim 1, wherein processor is configured to output a ratio or difference between even function strength and odd function strength of the component data to the display.

6. A chromatography quality control method including:

storing in a storage device measurement data obtained as a result of a chromatographic measurement, the measurement data being three-dimensional data having a retention-time direction, a spectral direction, and an intensity as elements;

retrieving the measurement data from the storage device;

dimensionally compressing the measurement data in a spectral direction by factorization to generate component data including a first main component data piece and an n-th main component data piece; and displaying a graph, the graph having a first axis representing an intensity of the first main component data piece and a second axis representing an intensity of the n-th main component data piece.

* * * * *